(12) United States Patent
Lin et al.

(10) Patent No.: US 10,880,103 B2
(45) Date of Patent: *Dec. 29, 2020

(54) SRAM-BASED AUTHENTICATION CIRCUIT

(71) Applicant: Taiwan Semiconductor Manufacturing Co., Ltd., Hsin-Chu (TW)

(72) Inventors: Chien-Chen Lin, Kaohsiung (TW); Shih-Lien Linus Lu, Hsinchu (TW); Wei Min Chan, Sindian (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,745

(22) Filed: Oct. 7, 2019

(65) Prior Publication Data

US 2020/0044873 A1 Feb. 6, 2020

Related U.S. Application Data

(63) Continuation of application No. 15/288,382, filed on Oct. 7, 2016, now Pat. No. 10,439,827.

(51) Int. Cl.
*G11C 11/419* (2006.01)
*H04L 9/32* (2006.01)
*G06F 12/14* (2006.01)
*G06F 21/44* (2013.01)
*G06F 21/73* (2013.01)

(52) U.S. Cl.
CPC ........ *H04L 9/3278* (2013.01); *G06F 12/1408* (2013.01); *G06F 21/44* (2013.01); *G06F 21/73* (2013.01); *G06F 2212/1052* (2013.01); *G06F 2212/402* (2013.01)

(58) Field of Classification Search
CPC .................................................. G11C 11/419
USPC .................................................. 365/189.011
See application file for complete search history.

(56) References Cited

U.S. PATENT DOCUMENTS

| | | |
|---|---|---|
| 8,605,523 B2 | 12/2013 | Tao et al. |
| 8,630,132 B2 | 1/2014 | Cheng et al. |
| 8,760,948 B2 | 6/2014 | Tao et al. |
| 8,908,421 B2 | 12/2014 | Liaw |
| 8,929,160 B2 | 1/2015 | Katoch et al. |
| 8,964,492 B2 | 2/2015 | Hsu et al. |
| 8,982,643 B2 | 3/2015 | Lum |
| 9,117,510 B2 | 8/2015 | Yang et al. |
| 9,208,858 B1 | 12/2015 | Lin et al. |
| 9,218,872 B1 | 12/2015 | Liaw |
| 10,439,827 B2 * | 10/2019 | Lin ............... G06F 12/1408 |
| 2014/0153345 A1 | 6/2014 | Kim et al. |
| 2014/0233330 A1 | 8/2014 | Ko et al. |

(Continued)

*Primary Examiner* — Min Huang
(74) *Attorney, Agent, or Firm* — Duane Morris LLP

(57) ABSTRACT

A memory device includes a memory block that includes a plurality of memory bits, wherein each bit is configured to present a first logical state; and an authentication circuit, coupled to the plurality of memory bits, wherein the authentication circuit is configured to access a first bit under either a reduced read margin or a reduced write margin condition to determine a stability of the first bit by detecting whether the first logical state flips to a second logical state, and based on the determined stability of at least the first bit, to generate a physically unclonable function (PUF) signature.

17 Claims, 10 Drawing Sheets

(56) References Cited

U.S. PATENT DOCUMENTS

| | | | |
|---|---|---|---|
| 2015/0340073 A1* | 11/2015 | Seo | G11C 7/22 |
| | | | 365/189.09 |
| 2015/0348598 A1 | 12/2015 | Wang et al. | |
| 2015/0371702 A1 | 12/2015 | Wu et al. | |
| 2015/0380077 A1 | 12/2015 | Wu et al. | |
| 2015/0380078 A1 | 12/2015 | Liaw | |
| 2017/0038807 A1* | 2/2017 | Bittlestone | G06F 1/26 |
| 2017/0277457 A1* | 9/2017 | Lu | G06F 3/0673 |
| 2018/0102163 A1* | 4/2018 | Lin | H04L 9/3278 |
| 2018/0151224 A1* | 5/2018 | Chih | G11C 13/0059 |

* cited by examiner

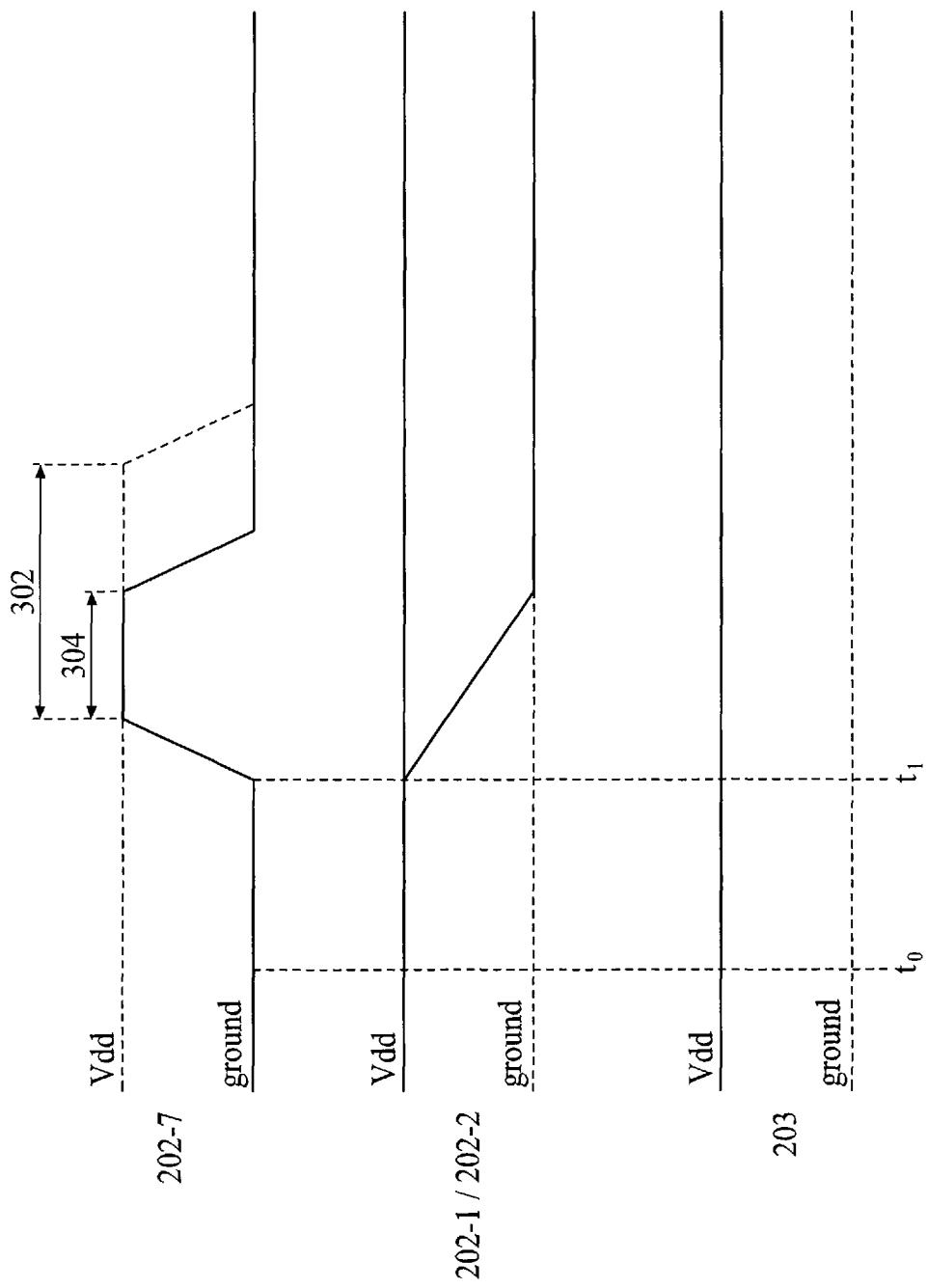

SRAM-BASED AUTHENTICATION CIRCUIT

CROSS-REFERENCE TO RELATED APPLICATION

This application is a continuation application of U.S. patent application Ser. No. 15/288,382, filed Oct. 7, 2016, which is incorporated by reference herein in its entirety.

BACKGROUND

With the increasing use of electronic devices utilizing integrated circuits to provide different types of information for a variety of different applications, there has been an increasing need to adequately protect sensitive and/or critical information that may be stored within an electronic device to limit access to such information to only such other devices that have permission to access the information. Some examples of applications include the authentication of devices, protection of confidential information within a device, and securing a communication between two or more devices.

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF. With the establishment of the identity, secure communication can be provided between devices. The PUF can also be used for existing authentication purposes to replace the current method of assigning an identity to an electronic device. Since the PUF is based on intrinsic properties of a manufacturing process, the PUF has various advantages over conventional authentication approaches that inscribes an identity on a device which may be mimicked and/or reverse engineered more easily.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

FIG. 3E illustrates exemplary signals used by the memory device of FIG. 1 to generate a physically unclonable function (PUF) signature based on yet another reduced write margin, in accordance with some embodiments.

DETAILED DESCRIPTION OF EXEMPLARY EMBODIMENTS

Figure 1:
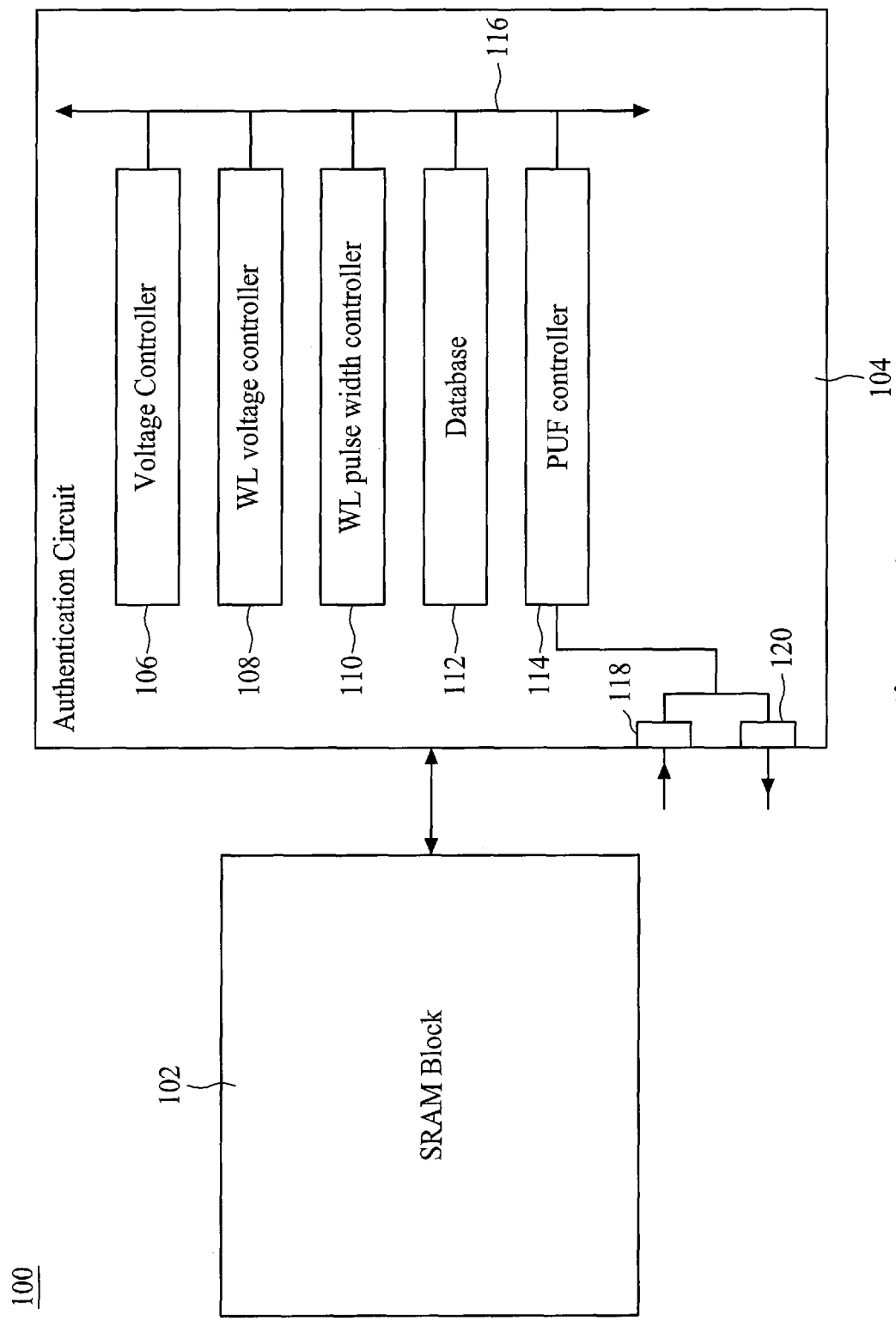
FIG. 1 illustrates an exemplary block diagram of a memory device that includes an authentication circuit, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physical unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a plurality of ICs, each IC may be slightly different due to manufacturing variability. PUF's leverage this variability to derive "secret" information that is unique to each of the ICs (e.g., a silicon "biometric"). Generally, such secret information is referred to as a "PUF signature" of the IC. In addition, due to the manufacturing variability that defines the signature, one cannot manufacture two identical ICs even with full knowledge of the IC's design. Various types of variability of an IC can be used to define such a signature such as, for example, gate delay(s), threshold voltage(s), power-on state(s) of a static random-access memory (SRAM) device, and/or any of a variety of physical characteristics of an IC.

In an example of using the manufacturing variability of each bit across an SRAM device to generate a PUF signature, an intrinsic tendency of a bit may be used to determine whether such a bit is suitable to provide a reliable PUF signature, in accordance with various embodiments of the present disclosure. It is understood that even though an SRAM device includes symmetric cells (bits), one or more manufacturing variabilities may still cause each bit of the SRAM device to intrinsically tend to be at a high state (i.e., a logical "1") or at a low state (i.e., a logical "0") while the SRAM device is accessed (e.g., powered-on, read, written, etc.). In other words, each bit may have an intrinsic tendency to present either a logical 1 or a logical 0, and moreover, some bits may have a strong intrinsic tendency and some bits may have a weak intrinsic tendency. When a bit has a strong intrinsic tendency, the bit may remain at or transition to its "preferred" logical state every time the SRAM device is accessed. In some embodiments, such a bit may be referred to as a "stable bit." When a bit has a weak intrinsic tendency, the bit does not have a "preferred" logical state. That is, the bit with weak intrinsic tendency may sometimes present (e.g., remain at or transition to) a first logical state and sometimes present (e.g., remain at or transition to) a second logical state every time the SRAM device is accessed. In some embodiments, such a bit may be referred to as an "unstable bit."

Embodiments of the present disclosure provide an authentication circuit, coupled to an SRAM block including a plurality of bits, that is configured to identify each bit's intrinsic tendency type, i.e., either a strong intrinsic tendency or a weak intrinsic tendency by using various "reduced margin" techniques. Upon the identification of each bit's intrinsic tendency type, the authentication circuit may filter out the bit(s) that have a weak intrinsic tendency (i.e., the unstable bit(s)), and use the bit(s) that have a strong intrinsic tendency (i.e., the stable bit(s)) to generate a PUF signature. As such, the PUF signature generated based on the stable bits may be more reliable since the PUF signature uses the above-mentioned preferred logical state provided by each of the stable bits across the SRAM block.

FIG. 1 illustrates a memory device 100 in accordance with various embodiments. As shown, the memory device 100 includes an SRAM block 102, and an authentication circuit 104 coupled to the SRAM block 102. Although the authentication circuit 104 is illustrated as a separate component from the SRAM block 102 in the illustrated embodiment of FIG. 1, in some embodiments, the authentication circuit 104 may be integrated or embedded in the SRAM block 102 while remaining within the scope of the present disclosure. According to some embodiments of the present disclosure, the authentication circuit 104 is configured to generate an unique PUF signature for the SRAM block 102 by using the above-mentioned "preferred" logical state(s) of bits of the SRAM block 102, which will be discussed in detail as follows.

In some embodiments, the SRAM block 102 includes a plurality of (memory) bits. The plurality of bits are arranged in a column-row configuration, i.e., an array, which will be shown and discussed in further detail below with respect to an exemplary schematic diagram of FIG. 2A. Moreover, each of the bits of the SRAM block 102 includes a 6-transistor SRAM (6T-SRAM) bit, which will be described in further detail below with respect to FIG. 2B. However, the bits of the SRAM block 102 may be implemented as any of a variety of types of SRAM bits such as, for example, 2T-2R SRAM bit, 4T-SRAM bit, 8T-SRAM bit, etc.

As shown, in some embodiments, the authentication circuit 104 includes a voltage controller 106, a word line (WL) controller 108, a WL pulse width controller 110, a data base 112, and a physically unclonable function (PUF) controller 114 each coupled to each other through a data bus 116. In some embodiments, all the components of the authentication circuit 104 (i.e., the voltage controller 106, the WL voltage controller 108, the WL pulse width controller 110, the database 112, and the PUF controller 114) may be coupled to a common data bus 116 for inter-communication. In some embodiments, the authentication circuit 104 includes an input port 118 and an output port 120. The input port 118 of authentication circuit 104 is configured to receive a request/challenge (e.g., a request to power on the coupled SRAM block 102, a request to access confidential information of the SRAM block 102, etc.). In some embodiments, the output port 120 of the authentication circuit 104 is configured to provide a response (e.g., a PUF signature) in response to the request based on the preferred logical states of the bits of the SRAM block 102. In some embodiments, such input and output ports may be directly coupled to the PUF controller 114. That is, in accordance with such embodiments, the PUF controller 114 is configured to receive a request through the input port 118 and provide a response through the output port 120. In some embodiments, the request and the corresponding response provided by the authentication circuit 104/the PUF controller 114 may be both stored as a request-response pair for further cryptographic use (e.g., a cryptographic key generation process).

As described above, each bit's intrinsic tendency (i.e., either a strong or a weak intrinsic tendency) is identified by the authentication circuit 104 by various reduced margin techniques. Further, in some embodiments, each of the reduced margin techniques may be performed by the voltage controller 106, the WL voltage controller 108, the WL pulse width controller 110, and/or the PUF controller 114. More specifically, the PUF controller 114 may use the data bus 116 to control the voltage controller 106 so as to cause the voltage controller 106 to provide either a reduced "bit voltage" for a reduced "read margin" or an increased "bit voltage" for a reduced "write margin." The PUF controller 114 may use the data bus 116 to control the WL voltage controller 108 so as to cause the WL voltage controller 108 to provide either an increased "WL voltage" for a reduced "read margin" or a reduced "WL voltage" for a reduced "write margin" Further, the PUF controller 114 may use the data bus 116 to control the WL pulse width controller 110 so as to cause the WL pulse width controller 110 to provide a reduced "WL pulse width" for a reduced "write margin," which will be described in further detail below with respect to FIGS. 3A, 3B, 3C, 3D, and 3E, respectively.

Referring still to FIG. 1, in some embodiments, the database 112 includes a non-volatile memory (NVM) device, wherein the NVM device may include a plurality of cells. In some embodiments, each cell of the database 112 may include a single bit (hereinafter a "NVM bit"), but in some other embodiments, each cell of the database 112 may include two or more NVM bits while remaining within the scope of the present disclosure. Each NVM bit of the cell may be referred to as a "fuse." For example, if the database 112 includes 10 cells and each cell has one NVM bit, then the database 112 includes 10 NVM fuses. In some embodiments, the database 112 is configured to store locations of either stable bits or unstable bits, which will be discussed in further detail below with respect to FIGS. 3A-3E.

Figure 2A:
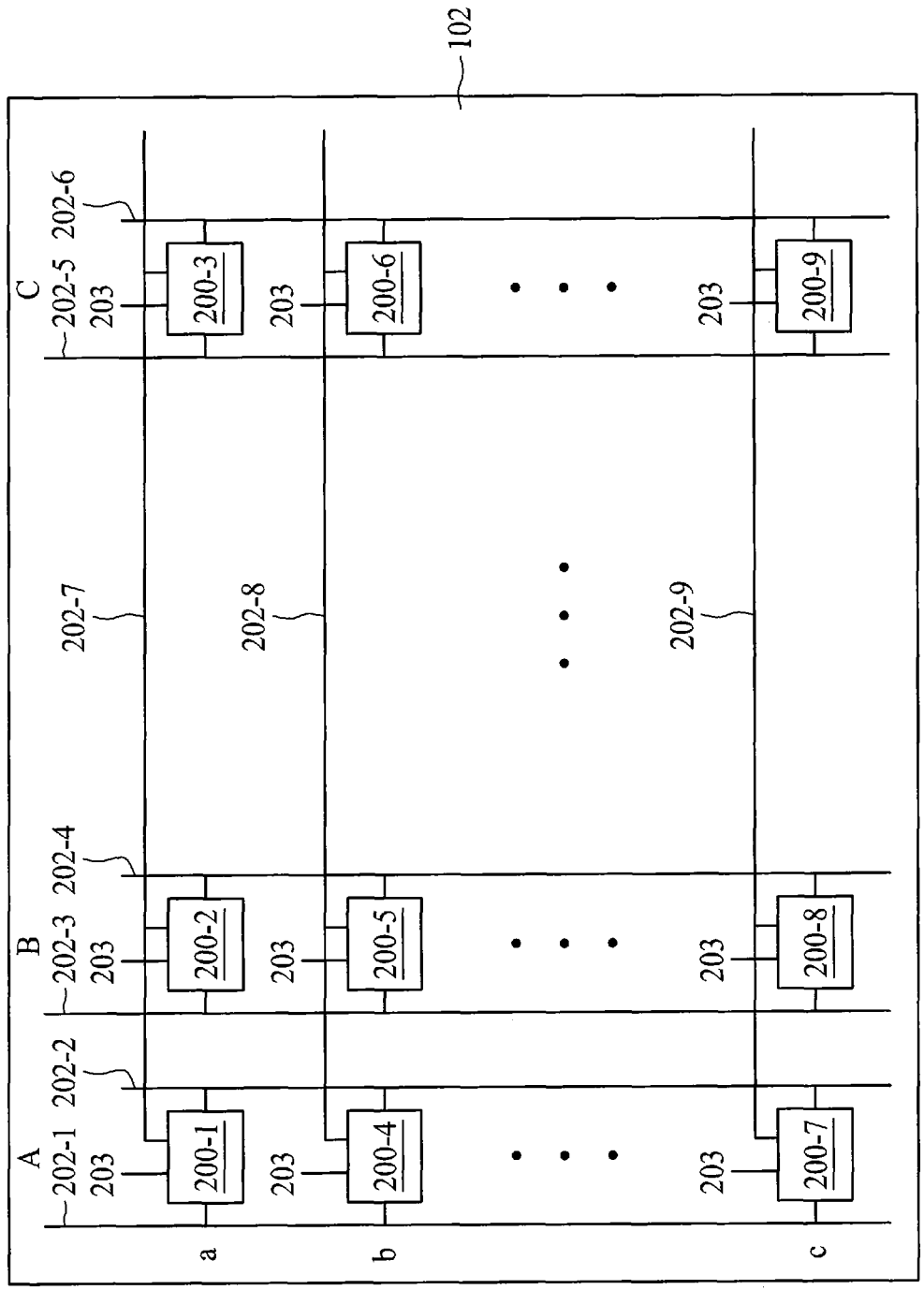
FIG. 2A illustrates an exemplary circuit diagram of a memory block of the memory device of FIG. 1, in accordance with some embodiments.

Referring now to FIG. 2A, an exemplary circuit diagram of the SRAM block 102 is shown. In some embodiments, the SRAM block 102 includes a plurality of bits 200-1, 200-2, 200-3, 200-4, 200-5, 200-6, 200-7, 200-8, and up to 200-9. Although only 9 bits are shown, any desired number of bits may be included in the SRAM block 102 while remaining within the scope of the present disclosure. As described above, the bits 200-1, 200-2, 200-3, 200-4, 200-5, 200-6, 200-7, 200-8, and 200-9 are arranged in a column-row configuration. More specifically, in some embodiments, the SRAM block 102 includes bit lines (BL's) 202-1, 202-3, and 202-5 arranged in parallel, bit bar lines (BBL's) 202-2, 202-4, and 202-6 also arranged in parallel, and word lines (WL's) 202-7, 202-8, and 202-9 arranged in parallel orthogonally to the BL's and BBL's. As such, the SRAM block 102 may include a first plurality of columns (e.g., arranged vertically) and a second plurality of rows (e.g., arranged horizontally), wherein each column includes a respective pair of BL and BBL and each row includes a respective WL. For example, as shown in the illustrated embodiment of FIG. 2A, the SRAM block 102 includes columns "A," "B," and "C," and rows "a," "b," and "c," wherein column A includes respective BL 202-1 and BBL 202-2; column B includes respective BL 202-3 and BBL 202-4; column C includes respective BL 202-5 and BBL 202-6; row a includes a respective WL 202-6; row b includes a respective WL 202-8; and row c includes a respective WL 202-9.

Moreover, each column includes one or more bits that are each coupled to the column's respective BL and BBL, and a different separate WL. For example, column A includes bits 200-1, 200-4, and 200-7, wherein the bits 200-1, 200-4, and 200-7 are each coupled to the BL 202-1 and BBL 202-2, and WL's 202-7, 202-8, and 202-9, respectively; column B includes bits 200-2, 200-5, and 200-8, wherein the bits 200-2, 200-5, and 200-8 are each coupled to the BL 202-3 and BBL 202-4, and WL's 202-7, 202-8, and 202-9, respectively; and column C includes bits 200-3, 200-6, and 200-9, wherein the bits 200-3, 200-6, and 200-9 are each coupled to the BL 202-5 and BBL 202-6, and WL's 202-7, 202-8, and 202-9, respectively.

As described above, each bit of the SRAM block 102 (e.g., 200-1, 200-2, 200-3, 200-4, 200-5, 200-6, 200-7, 200-8, 200-9, etc.) may include a plurality of transistors (e.g., six MOSFET's for a 6T SRAM bit, eight MOSFET's for an 8T SRAM bit, etc.) to store a data bit. In some embodiments, such a data bit stored in each bit may be written to the bit by applying either a high state (i.e., a logical "1") or a low state (i.e., a logical "0") through a corresponding BL, BBL, and/or WL, which will be described in further detail below.

Figure 2B:
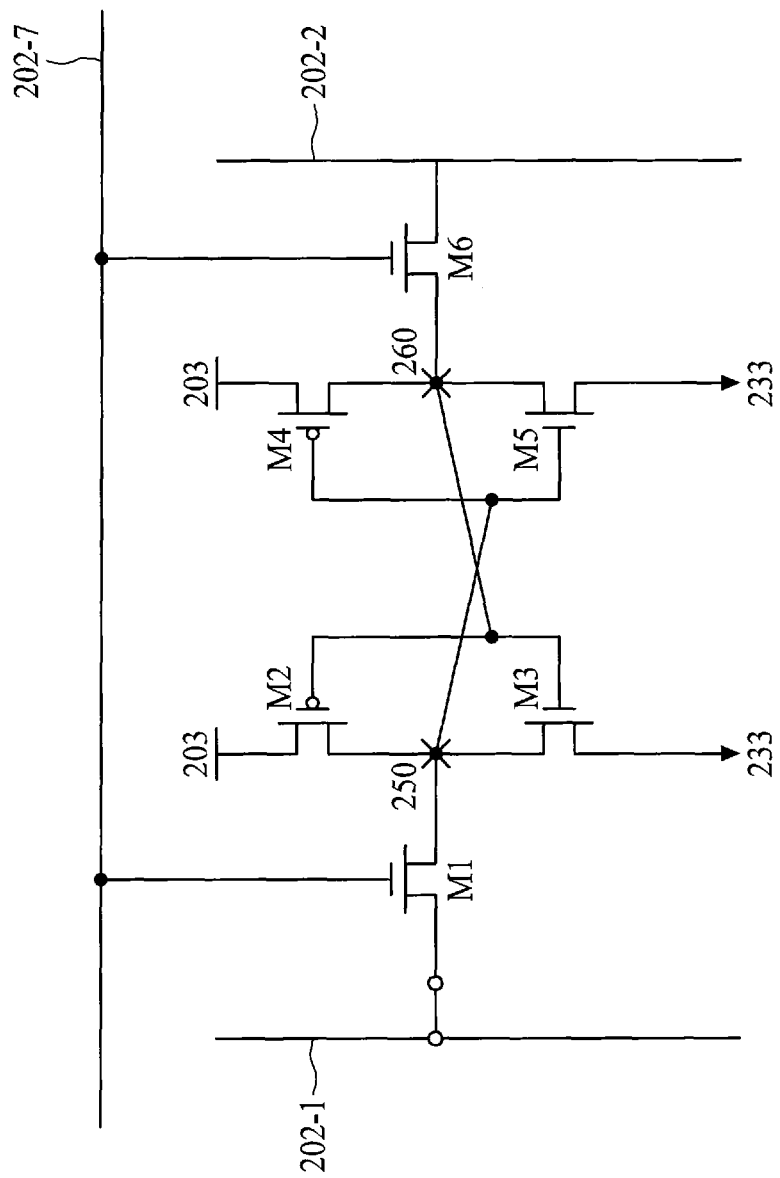
FIG. 2B illustrates an exemplary circuit diagram of a memory bit of the memory block of FIG. 2A, in accordance with some embodiments.

FIG. 2B illustrates an exemplary circuit diagram of the bit 200-1 that is implemented as a 6T-SRAM bit, in accordance with various embodiments of the present disclosure. As shown, the bit 200-1 includes transistors: M1, M2, M3, M4, M5, and M6. Since the bits of the SRAM block 102 are substantially similar to one another, for clarity, the following discussions of configurations and operations of the transistors of the bits will be directed to the bit 200-1 only.

In some embodiments, the transistor M2 and M3 are formed as a first inverter and the transistors M4 and M5 are formed as a second inverter wherein the first and second inverters are coupled to each other. More specifically, the first and second inverters are each coupled between first voltage reference 203 and second voltage reference 233. Generally, the first voltage reference 203 is a voltage level of a supply voltage applied to the bit 200-1. In some embodiments, the first voltage reference 203 is typically referred to as a "bit voltage." The second voltage reference 233 is typically referred to as "ground." In some embodiments, the bit voltage 203 is controlled by the voltage controller 106 of the authentication circuit 104 (FIG. 1). For example, the bit voltage 203 may range from about 30% of Vdd to about 130% of Vdd, wherein Vdd is a nominal voltage level applied to each of the bits of the SRAM block 102 when the SRAM block 102 is accessed. Further, the first inverter is coupled to the transistor M1, and the second inverter is coupled to the transistor M6. In addition to being coupled to the inverters, the transistors M1 and M6 are both coupled to the WL 202-7 and each coupled to the BL 202-1 and BBL 202-2, respectively. The transistors M1 and M6 are typically referred to as access transistors of the bit 200-1. In some embodiments, the transistors M1, M3, M5, and M6 each includes an NMOS transistor, and M2 and M4 each includes a PMOS transistor. Although the illustrated embodiments of FIG. 2B shows that M1-M6 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

In general, when an SRAM bit (e.g., 200-1, 200-2, 200-3, 200-4, etc.) presents/stores a data bit, a first node of the SRAM bit is configured to be at a first logical state (1 or 0), and a second node of the SRAM bit is configured to be at a second logical state (0 or 1), wherein the first and second logical states are complementary with each other. In some embodiments, the first logical state at the first node is the data bit stored by the SRAM cell. For example, in the illustrated embodiment of FIG. 2B, the bit 200-1 includes nodes 250 and 260. When the bit 200-1 presents a data bit (e.g., a logical 1), the node 250 is configured to be at the logical 1 state, and the node 260 is configured to be at the logical 0 state.

More specifically, such a data bit may be written to the bit 200-1 by using corresponding BL 202-1, BBL 202-2, and WL 202-7. As a representative example, to write a logical 1 to the bit 200-1, in some embodiments, the voltage controller 106 turns on the bit 200-1 by pulling up the bit voltage 203 to a desired value, e.g., Vdd. Then the WL voltage controller 108 asserts the WL 202-7 by pulling up the WL 202-7 to a desired "WL voltage" (e.g., Vdd), so that the access transistors M1 and M6 are turned on. More specifically, the WL 202-7 remains at the WL voltage for a certain period of time, hereinafter "WL pulse width," which may be controlled by the WL pulse width controller 110. During the WL pulse width (i.e., M1 and M6 are ON), the BL 202-1 and the BBL 202-2 are each applied with a first voltage (e.g., Vdd) corresponding to a high logical state and a second voltage (e.g., ground) corresponding to a low logical state, respectively, to write a logical 1 to the node 250 and a logical 0 to the node 260. On the other hand, to read out the written, or stored, logical state from the bit 200-1, in some embodiments, the voltage controller 106 pulls up the bit voltage 203 of the bit 200-1 to about Vdd. The WL voltage controller 108 then pre-charges the BL 202-1 and BBL 202-2 to Vdd. The WL voltage controller 108 asserts the WL 202-7 by pulling up the WL 202-7 to the desired WL voltage (e.g., Vdd), so that the access transistors M1 and M6 are turned on. Accordingly, the logical state stored in the bit 200-1 is read out by comparing either a voltage difference or a current difference between the BL 202-1 and the BBL 202-2.

In some embodiments, the read-out operation may be performed by the PUF controller 114 (FIG. 1). As such, the PUF controller 114 may include one or more input/output (I/O) circuits such as, for example, sensing amplifier(s), etc., to perform such a functionality. In some other embodiments, the one or more I/O circuits may be implemented as an independent circuit block either inside or outside the authentication circuit 104. For example, the one or more I/O circuits may be integrated into the SRAM block 102.

Figure 3A:
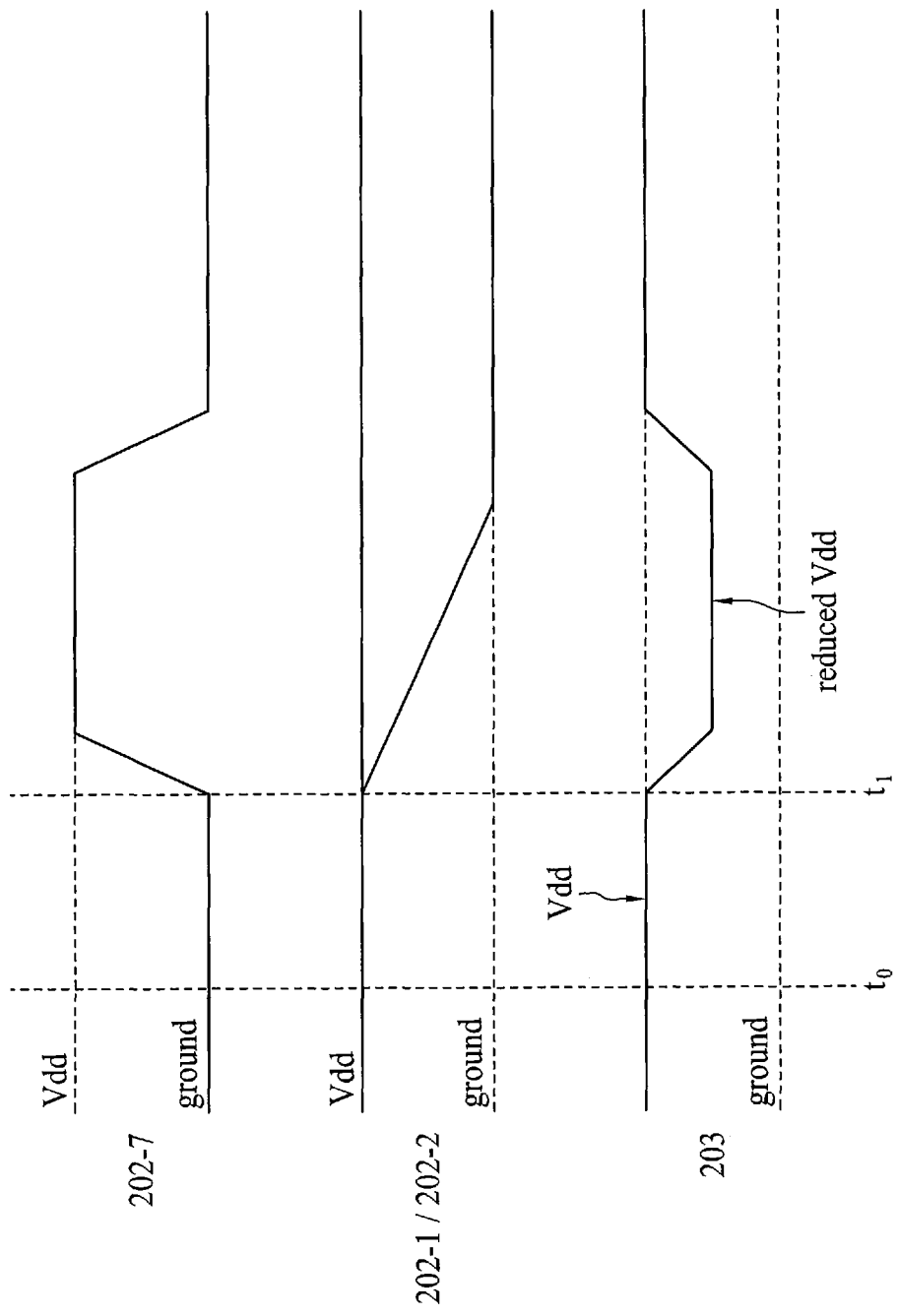
FIG. 3A illustrates exemplary signals used by the memory device of FIG. 1 to generate a physically unclonable function (PUF) signature based on a reduced read margin, in accordance with some embodiments.
Figure 3B:
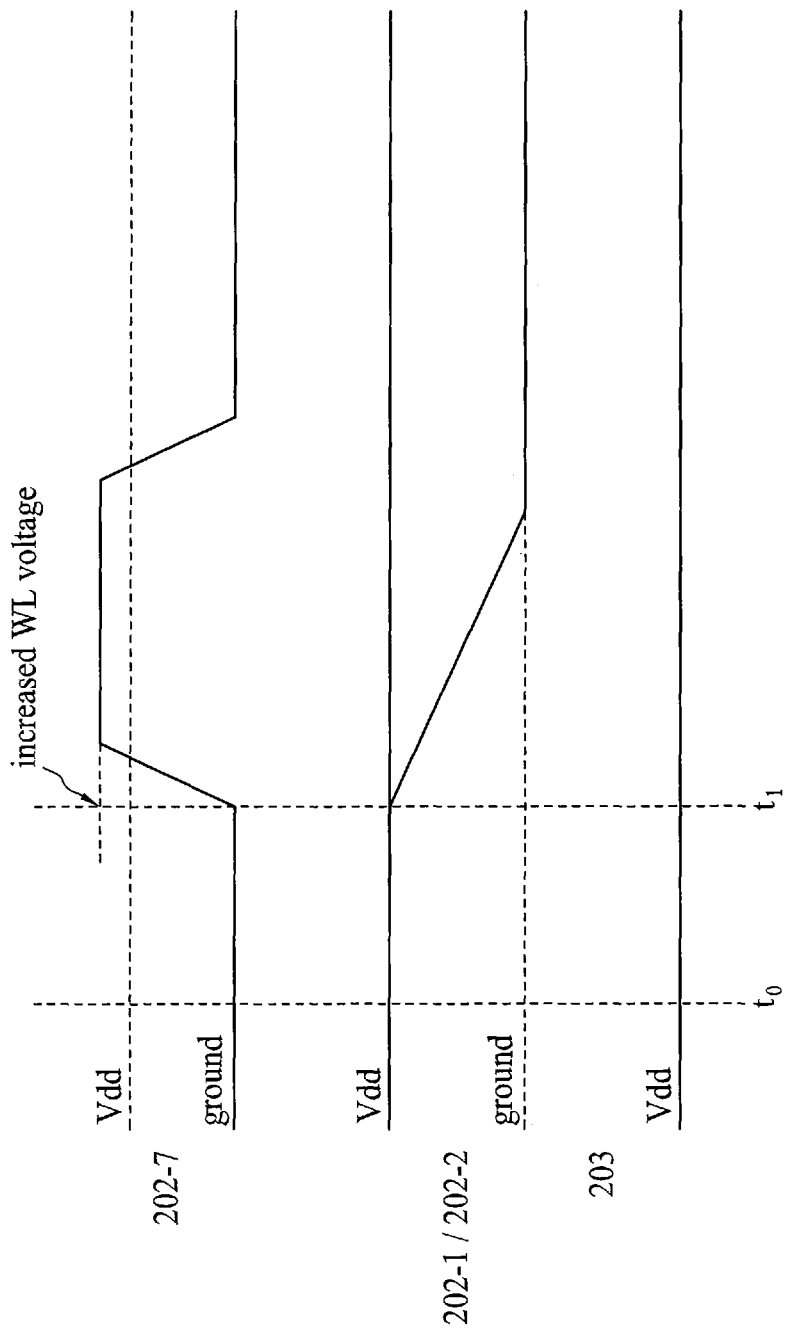
FIG. 3B illustrates exemplary signals used by the memory device of FIG. 1 to generate a physically unclonable function (PUF) signature based on another reduced read margin, in accordance with some embodiments.
Figure 3C:
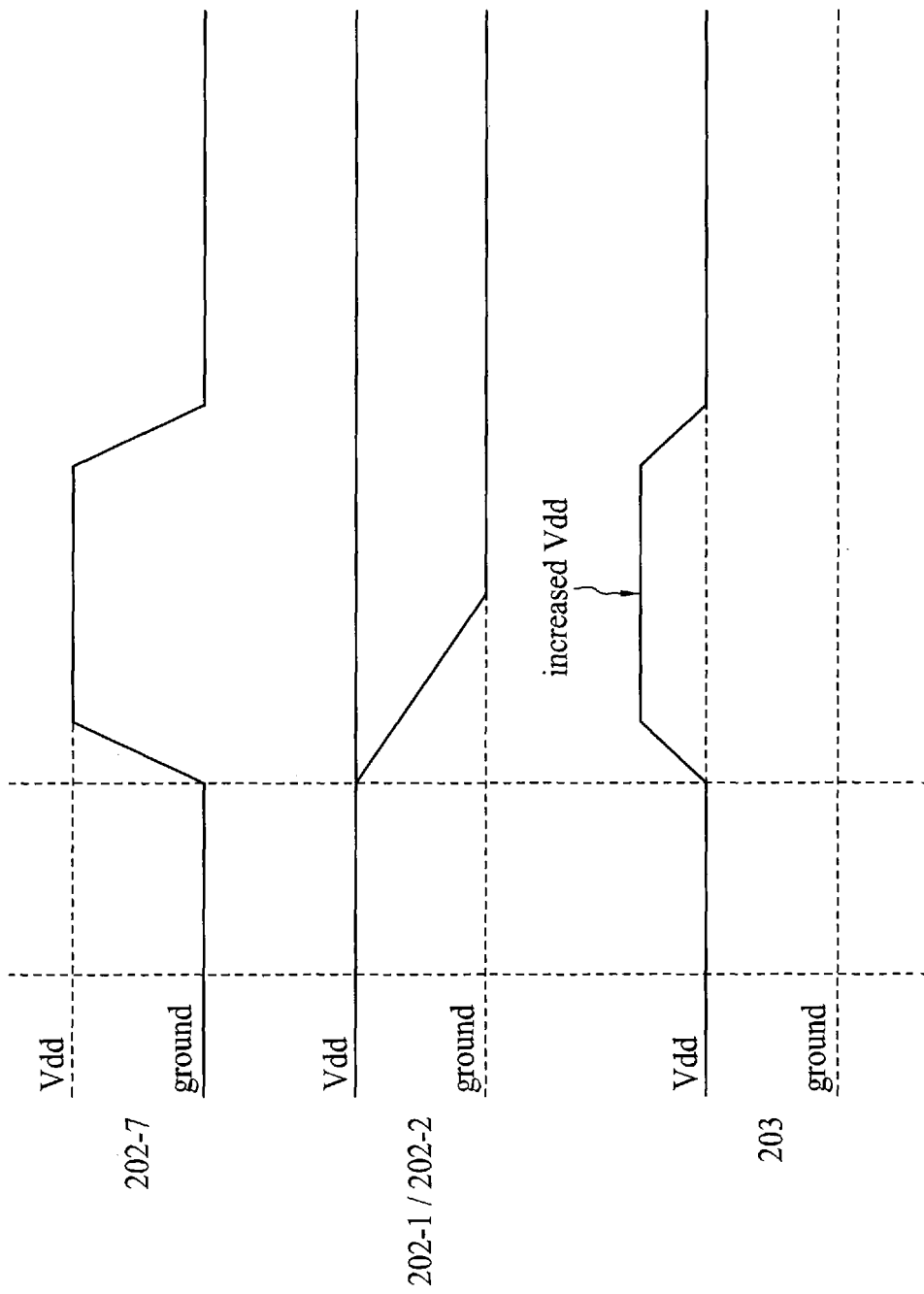
FIG. 3C illustrates exemplary signals used by the memory device of FIG. 1 to generate a physically unclonable function (PUF) signature based on a reduced write margin, in accordance with some embodiments.
Figure 3D:
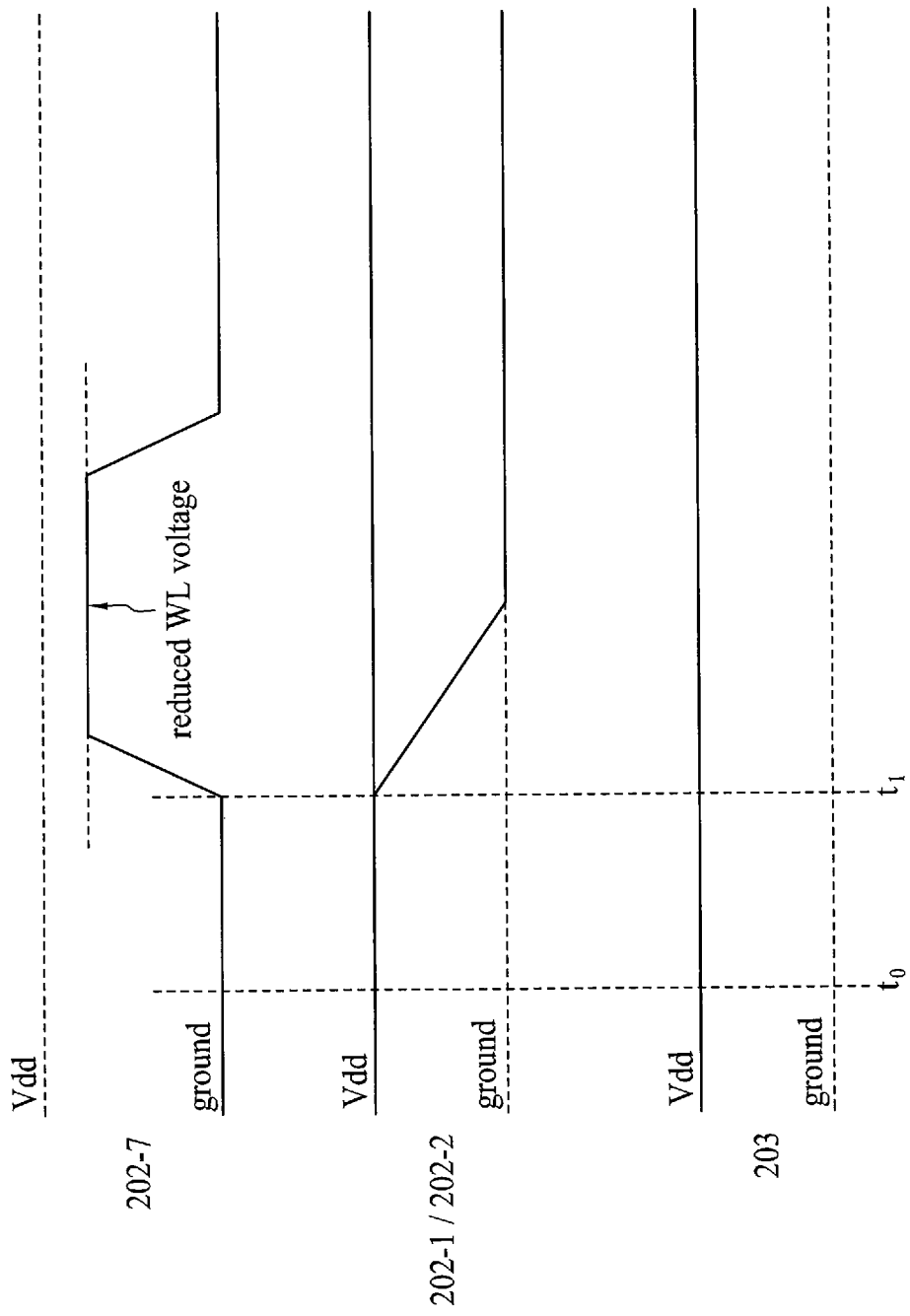
FIG. 3D illustrates exemplary signals used by the memory device of FIG. 1 to generate a physically unclonable function (PUF) signature based on another reduced write margin, in accordance with some embodiments.

To recap, each bit of the SRAM block 102 has either a strong intrinsic tendency or a weak intrinsic tendency, in accordance with various embodiments. When a bit has a strong intrinsic tendency, the bit is categorized as a stable bit and accordingly having a preferred logical state. When a bit has a weak intrinsic tendency, the bit is categorized as an unstable bit and thus having no preferred logical state. In some embodiments, a stability of a bit (i.e., either stable or unstable) may be determined by the above-mentioned "reduced margin" techniques. More specifically, FIGS. 3A and 3B are directed to the discussions of using "reduced read margin" techniques to determine each bit's stability. FIGS. 3C, 3D, and 3E are directed to the discussions of using "reduced write margin" techniques to determine each bit's stability. Since the reduced margin techniques are performed by one or more of the components described in FIGS. 1-2B, the following discussions of FIGS. 3A-3E will be provided in conjunction with FIGS. 1-2B.

In some embodiments, in response to a challenge received through the input port 118, the PUF controller 114 (FIG. 1) is configured to cause one or more corresponding components of the authentication circuit 104 (e.g., the voltage controller 106, the WL voltage controller 108, the WL pulse width controller 110, etc.) to perform at least one of the reduced margin techniques. Once the stability of each bit across the SRAM block 102 is determined by the PUF controller 114, in some embodiments, the PUF controller 114 may directly use the preferred logical states of the stable bits to generate a PUF signature.

Additionally or alternatively, in some embodiments, a "map" indicating each bit's stability may be generated by the PUF controller 114 and stored in the database 112. As described above, the database 112 may include a plurality of NVM bits that are each one-to-one mapped from the list of the SRAM block 102. As such, the map may include a plurality of NVM bits, and each NVM bit in the map may include information of the stability of the corresponding bit of the SRAM block 102. Further, each NVM bit may include the respective preferred logical state if the corresponding bit of the SRAM block 102 is determined as a stable bit (i.e., having a strong intrinsic tendency). Such a map stored in the database 112 may be later accessed by the PUF controller 114 to generate another PUF signature. In some other embodiments, the map may be adaptively updated by the PUF controller 114 so as to keep the map to reflect the most up-to-date stability, and the respective preferred logical state, of each bit of the SRAM block 102.

FIG. 3A illustrates exemplary signals present of the WL 202-7, BL 202-1, BBL 202-2, and bit voltage 203 when a logical state of the bit 200-1 is read out under a reduced bit voltage, in accordance with various embodiments. Each of the signals transitions between a high logical state (e.g., Vdd) and a low logical state (e.g., ground) over time. In some embodiments, before the bit 200-1 is read at time "t0," the voltage controller 106 turns on the bit 200-1 in advance by pulling up the bit voltage 203 to Vdd, and pre-charges the BL 202-1 and BBL 202-2 to Vdd. When the bit 200-1 is read, i.e., at time "t1," the WL voltage controller 108 asserts the WL 202-7 so that the WL voltage on the WL 202-7 is pulled up to Vdd. For clarity, the numeral 202-7 is interchangeably used to refer to the WL 202-7 itself and the WL voltage on the WL 202-7. Prior to, simultaneously with, or subsequently to the WL voltage 202-7 transitioning to Vdd, the PUF controller 114 may cause the voltage controller 106 to decrease the bit voltage 203 from Vdd to a "reduced Vdd," as shown. In some embodiments, the reduced Vdd is about 30% Vdd to about 80% Vdd. Operating the bit 200-1 under such a reduced Vdd when the bit 200-1 is read may result in a reduced read margin for the bit 200-1. More specifically, when the bit 200-1 is read under the reduced Vdd, an originally stored logical state in the bit 200-1 may be subjected to change. For example, when the bit 200-1 originally presents/stores a logical 1 before a read operation, it is expected to read a logical 1 from the bit 200-1 while the bit voltage 203 of the bit 200-1 remains at Vdd. However, in some embodiments, the reduced Vdd may cause the bit 200-1 to be read as having a logical state that is complementary to the expected logical state, i.e., a logical 0. That is, under the reduced Vdd, the expected logical state, also the originally stored logical state, may flip. In some embodiments, such a flipping of the logical state under the reduced Vdd may cause the bit 200-1 to be categorized as having a strong intrinsic tendency, and such flipped logical state (i.e., the logical 0 in this example) may represent the bit 200-1's preferred logical state. Consequently, the PUF controller 114 may determine the bit 200-1 is a stable bit, which will be used to generate a PUF signature. However, if the reduced Vdd does not cause the bit 200-1 to be read as having a flipped logical state, the PUF controller 114 may determine the bit 200-1 is an unstable bit that will not be used to generate a PUF signature. Following the above-described operations, the PUF controller 114 is configured to cause the voltage controller 106 to provide the reduced Vdd to each bit of the SRAM block 102 so as to determine each bit's stability across the SRAM block 102, and in some embodiments, use the determined stabilities of the bits across the SRAM block 102 to generate a PUF signature.

FIG. 3B illustrates exemplary signals present of the WL 202-7, BL 202-1, BBL 202-2, and bit voltage 203 when a logical state of the bit 200-1 is read out under an increased WL voltage, in accordance with various embodiments. Each of the signals transitions between a high logical state (e.g., an increased WL voltage) and a low logical state (e.g., ground) over time. Similarly, in some embodiments, before the bit 200-1 is read at time "t0," the voltage controller 106 turns on the bit 200-1 in advance by pulling up the bit voltage 203 to Vdd, and pre-charges the BL 202-1 and BBL 202-2 to Vdd. When the bit 200-1 is read at time "t1," the PUF controller 114 may cause the WL voltage controller 108 to increase the WL voltage 202-7 beyond Vdd to the "increased WL voltage," as shown. In some embodiments, the increased WL voltage is about 110% Vdd to about 130% Vdd. Operating the bit 200-1 under such an increased WL voltage when the bit 200-1 is read may result in a reduced read margin for the bit 200-1. More specifically, when the bit 200-1 is read under the increased WL voltage, an originally stored logical state in the bit 200-1 may be subjected to change, which is substantially similar to the flipping of the originally stored logical state discussed in FIG. 3A. Thus, the PUF controller 114 may determine the bit 200-1's stability and its preferred logical state, if available. In some embodiments, the PUF controller 114 may cause the WL voltage controller 108 to provide the increased WL voltage to each bit of the SRAM block 102 so as to identify each bit's stability across the SRAM block 102, and in some embodiments, use the identified stabilities across the SRAM block 102 to generate a PUF signature.

FIG. 3C illustrates exemplary signals present of the WL 202-7, BL 202-1, BBL 202-2, and bit voltage 203 when a logical state is written to the bit 200-1 under an increased bit voltage, in accordance with various embodiments. Each of the signals transitions between a high logical state (e.g., an increased Vdd) and a low logical state (e.g., ground) over time. In some embodiments, before the bit 200-1 is written with a logical state under an increased bit voltage, the bit 200-1 is already written with a first logical state. In some embodiments, the PUF controller 114 causes the voltage controller 106 to apply a first voltage (e.g., Vdd), corresponding to the first logical state, on the BL 202-1 so as to write the first logical state to the bit 200-1. In some embodiments, as shown, at time "t0," the bit voltage 203 is in advance pulled up to Vdd, and the BL 202-1 and BBL 202-2 are each pre-charges to Vdd during or after the first logical state is written. At time "t1," the WL voltage controller 108 then pulls up the WL voltage 202-7 to Vdd so as to turn on the access transistors (e.g., M1 and M6) of the bit 200-1. In some embodiments, at time t1, the PUF controller 114 may cause the voltage controller 106 to increase the bit voltage 203 from Vdd to the "increased Vdd," as shown, and to write a second logical state to the bit 200-1 through the BL 202-1 and BBL 202-2, wherein the second logical state is complementary to the first logical state. In some embodiments, the increased Vdd is about 110% Vdd to about 130% Vdd. Operating the bit 200-1 under such an increased Vdd when the bit 200-1 is written to may result in a reduced write margin for the bit 200-1. More specifically, when the bit 200-1 is written to under the increased Vdd, an originally stored logical state (i.e., the first logical state in this example) in the bit 200-1 may be subjected to change. For example, when the bit 200-1 originally presents/stores a logical 1 before a write operation with the reduced write margin, it is expected to read a logical 1 from the bit 200-1. However, in some embodiments, the increased Vdd may cause the bit 200-1 to be overwritten with a logical state that is complementary to the expected logical state, i.e., a logical 0. That is, under the increased Vdd, the expected logical state, also the first logical state, may be overwritten by the second logical state and thus flip. In some embodiments, such a flipping of the logical state under the increased Vdd when the bit 200-1 is written with a complementary logical state may cause the bit 200-1 to be categorized as having a strong intrinsic tendency, and such flipped logical state (i.e., the logical 0 in this example) may represent the bit 200-1's preferred logical state. As such, the PUF controller 114 may determine the bit 200-1 is a stable bit, which will be used to generate a PUF signature. On the other hand, if the increased Vdd does not cause the bit 200-1 to be overwritten with a flipped logical state, the PUF controller 114 may determine the bit 200-1 is an unstable bit that will not be used to generate a PUF signature. Following the above-described operations, the PUF controller 114 is configured to cause the voltage controller 106 to provide the increased Vdd to each bit of the SRAM block 102 so as to determine each bit's stability across the SRAM block 102, and in some embodiments, use the determined stabilities across the SRAM block 102 to generate a PUF signature. In some embodiments, after the write operation under the increased Vdd, the PUF controller 114 is configured to read out the logical state of each bit of the SRAM block 102 so as to determine whether a flipping occurs, and use the flipped logical states (i.e., the preferred logical states of the stable bits) of the bits to generate a PUF signature.

FIG. 3D illustrates exemplary signals present of the WL 202-7, BL 202-1, BBL 202-2, and bit voltage 203 when a logical state is written to the bit 200-1 under a decreased WL voltage, in accordance with various embodiments. Each of the signals transitions between a high logical state (e.g., Vdd) and a low logical state (e.g., ground) over time. In some embodiments, before the bit 200-1 is written with a logical state under an increased bit voltage, the bit 200-1 is already written with a first logical state. In some embodiments, the PUF controller 114 causes the voltage controller 106 to apply a first voltage (e.g., Vdd), corresponding to the first logical state, on the BL 202-1 so as to write the first logical state to the bit 200-1. In some embodiments, as shown, at time "t0," the bit voltage 203 is in advance pulled up to Vdd, and the BL 202-1 and BBL 202-2 are each pre-charges to Vdd during or after the first logical state is written. In some embodiments, at time "t1," the PUF controller 114 may cause the WL voltage controller 108 to pull up the WL voltage 202-7 to "decreased Vdd" so as to weakly turn on the access transistors (e.g., M1 and M6) of the bit 200-1. Further, at time t1, the PUF controller 114 may cause the voltage controller 106 to write a second logical state to the bit 200-1 through the BL 202-1 and BBL 202-2, wherein the second logical state is complementary to the first logical state. In some embodiments, the decreased WL voltage is about 30% Vdd to about 80% Vdd. Operating the bit 200-1 under such an decreased WL voltage when the bit 200-1 is written to may result in a reduced write margin for the bit 200-1. More specifically, when the bit 200-1 is written to under the decreased WL voltage, an originally stored logical state (i.e., the first logical state in this example) in the bit 200-1 may be subjected to change. For example, when the bit 200-1 originally presents/stores a logical 1 before a write operation with the reduced write margin, it is expected to read a logical 1 from the bit 200-1. However, in some embodiments, the decreased WL voltage may cause the bit 200-1 to be overwritten with a logical state that is complementary to the expected logical state, i.e., a logical 0. That is, under the decreased WL voltage, the expected logical state, also the first logical state, may be overwritten by the second logical state and thus flip. In some embodiments, such a flipping of the logical state under the decreased WL voltage when the bit 200-1 is written with a complementary logical state may cause the bit 200-1 to be categorized as having a strong intrinsic tendency, and such flipped logical state (i.e., the logical 0 in this example) may represent the bit 200-1's preferred logical state. As such, the PUF controller 114 may determine the bit 200-1 is a stable bit, which will be used to generate a PUF signature. On the other hand, if the decreased WL voltage does not cause the bit 200-1 to be overwritten with a flipped logical state, the PUF controller 114 may determine the bit 200-1 is an unstable bit that will not be used to generate a PUF signature. Following the above-described operations, the PUF controller 114 is configured to cause the WL voltage controller 108 to provide the decreased WL voltage to each bit of the SRAM block 102 so as to determine each bit's stability across the SRAM block 102, and in some embodiments, use the determined stabilities across the SRAM block 102 to generate a PUF signature. In some embodiments, after the write operation under the decreased WL voltage, the PUF controller 114 is configured to read out the logical state of each bit of the SRAM block 102 so as to determine whether a flipping occurs, and use the flipped logical states (i.e., the preferred logical states of the stable bits) of the bits to generate a PUF signature.

FIG. 3E illustrates exemplary signals present of the WL 202-7, BL 202-1, BBL 202-2, and bit voltage 203 when a logical state is written to the bit 200-1 under an decreased WL pulse width, in accordance with various embodiments. Each of the signals transitions between a high logical state (e.g., Vdd) and a low logical state (e.g., ground) over time. In some embodiments, before the bit 200-1 is written with a logical state under an increased bit voltage, the bit 200-1 is already written with a first logical state. In some embodiments, the PUF controller 114 causes the voltage controller 106 to apply a first voltage (e.g., Vdd), corresponding to the first logical state, on the BL 202-1 so as to write the first logical state to the bit 200-1. In some embodiments, before the first voltage is applied to the BL 202-1, the PUF controller 114 may cause the WL pulse width controller 110 to assert the WL 202-7 for a predetermined duration 302 so as to turn on the access transistors M1 and M6. In some embodiments, as shown, at time "t0," the bit voltage 203 is in advance pulled up to Vdd, and the BL 202-1 and BBL 202-2 are each pre-charges to Vdd during or after the first logical state is written. In some embodiments, at time "t1,"

the PUF controller 114 may cause the WL pulse width controller 110 to pull up the WL voltage 202-7 to Vdd but with a decreased WL pulse width 304, so as to weakly turn on the access transistors (e.g., M1 and M6) of the bit 200-1. Further, at time t1, the PUF controller 114 may cause the voltage controller 106 to write a second logical state to the bit 200-1 through the BL 202-1 and BBL 202-2, wherein the second logical state is complementary to the first logical state. Operating the bit 200-1 under such an decreased WL pulse width when the bit 200-1 is written to may result in a reduced write margin for the bit 200-1. More specifically, when the bit 200-1 is written to under the decreased WL pulse width, an originally stored logical state (i.e., the first logical state in this example) in the bit 200-1 may be subjected to change. For example, when the bit 200-1 originally presents/stores a logical 1 before a write operation with the reduced write margin, it is expected to read a logical 1 from the bit 200-1. However, in some embodiments, the decreased WL pulse width may cause the bit 200-1 to be overwritten with a logical state that is complementary to the expected logical state, i.e., a logical 0. That is, under the decreased WL pulse width, the expected logical state, also the first logical state, may be overwritten by the second logical state and thus flip. In some embodiments, such a flipping of the logical state under the decreased WL pulse width when the bit 200-1 is written with a complementary logical state may cause the bit 200-1 to be categorized as having a strong intrinsic tendency, and such flipped logical state (i.e., the logical 0 in this example) may represent the bit 200-1's preferred logical state. As such, the PUF controller 114 may determine the bit 200-1 is a stable bit, which will be used to generate a PUF signature. On the other hand, if the decreased WL pulse width does not cause the bit 200-1 to be overwritten with a flipped logical state, the PUF controller 114 may determine the bit 200-1 is an unstable bit that will not be used to generate a PUF signature. Following the above-described operations, the PUF controller 114 is configured to cause the WL pulse width controller 110 to provide the decreased WL pulse width to each bit of the SRAM block 102 so as to determine each bit's stability across the SRAM block 102, and in some embodiments, use the determined stabilities across the SRAM block 102 to generate a PUF signature. In some embodiments, after the write operation under the decreased WL pulse width, the PUF controller 114 is configured to read out the logical state of each bit of the SRAM block 102 so as to determine whether a flipping occurs, and use the flipped logical states (i.e., the preferred logical states of the stable bits) of the bits to generate a PUF signature.

In some alternative embodiments, the PUF controller 114 may use the voltage controller 106, the WL voltage controller 108, and the WL pulse width controller 110 to perform a hybrid reduced margin technique to determine each bit's stability. Using the circuit diagram of the SRAM block 102 in FIG. 2A as an example, the PUF controller 114 may use the voltage controller 106 to read logical states of the bits along column A under the reduced read margin, as described with respect to FIG. 3A, so as to determine the stability of each bit along column A, and the WL voltage controller 108 to write a logical state of the bits along column B under the reduced write margin, as described with respect to FIG. 3D, so as to determine the stability of each bit along column B.

Figure 4:
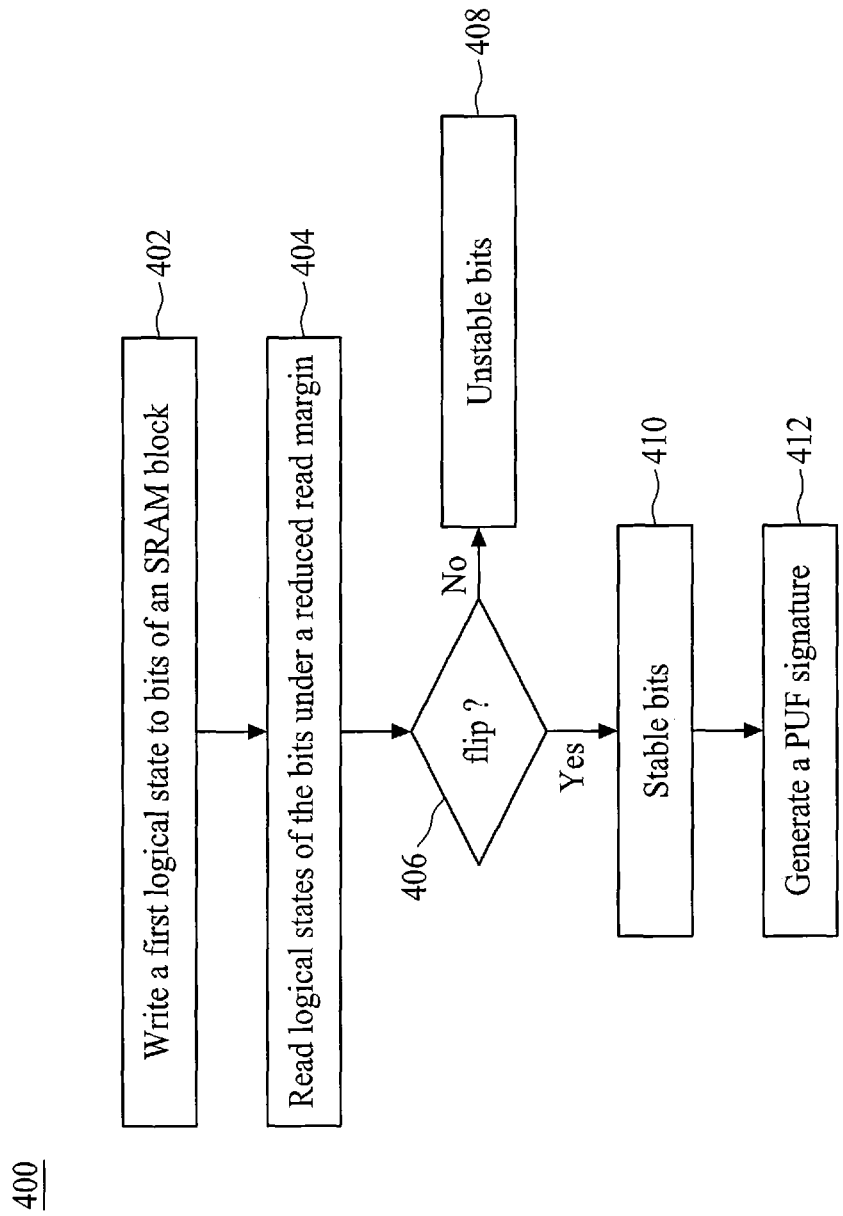
FIG. 4 illustrates an exemplary flow chart of a method of generating a physically unclonable function (PUF) signature based on one or more reduced read margins, in accordance with various embodiments.

FIG. 4 illustrates a flow chart of a method to generate a PUF signature for an SRAM block based on determining each bit's stability through one or more reduced read margin techniques, in accordance with various embodiments. In various embodiments, the operations of method 400 are performed by the respective components illustrated in Figures 1-3E. For purposes of discussion, the following embodiment of the method 400 will be described in conjunction with FIGS. 1-3E. The illustrated embodiment of the method 400 is merely an example. Therefore, it should be understood that any of a variety of operations may be omitted, re-sequenced, and/or added while remaining within the scope of the present disclosure.

The method 400 starts at operation 402 in which each bit of the SRAM block is written with a first logical state, in accordance with various embodiments. In an example, referring again to FIG. 1, in response to a challenge received through the port 118, the PUF controller 114 may cause the voltage controller 106 to turn on all the bits by pulling up each bit's bit voltage to a nominal voltage (e.g., Vdd), and, in some embodiments, use the WL voltage controller 108 to sequentially assert the plural WL's (e.g., 202-7, 202-8, 202-9, etc. of FIG. 2A) row by row so as to enable the respective bits on the asserted row to be written with the first logical state.

The method 400 continues to operation 404 in which the written logical states (i.e., the first logical state) are read out from the bits under a reduced read margin, in accordance with various embodiments. As described above, one or more reduced margin techniques may be performed by the PUF controller 114 to cause each bit to be read under a reduced read margin. For example, the PUF controller 114 may use the voltage controller 106 to provide a reduced Vdd as each bit's bit voltage 203, as shown and discussed in FIG. 3A. Alternatively, the PUF controller 114 may use the WL voltage controller 108 to provide an increased WL voltage to each bit, as shown and discussed in FIG. 3B. Under such reduced read margins, the first logical state that is originally written to each bit may be read out differently.

The method 400 continues to determination operation 406 in which a flipping of the first logical state for each bit is detected, in accordance with various embodiments. Continuing with the above example, the PUF controller 114 reads out each bit's logical state under the reduced read margin(s) so as to detect whether the first logical state has flipped to a second logical state that is complementary to the first logical state. If the first logical state has not flipped, the method 400 proceeds to operation 408 in which the PUF controller 114 determines such a bit is an unstable bit. And in some embodiments, the PUF controller 114 may not use such bits to generate a PUF signature. On the other hand, if the first logical state has flipped, the method 400 continues to operation 410 in which the PUF controller 114 determines such a bit is a stable bit.

The method 400 continues to operation 412 in which the stable bits are then used to generate a PUF signature, in accordance with various embodiments. Continuing with the above example, once the PUF controller 114 determines which bits across the SRAM block 102 are stable bits, the PUF controller 114 may use each stable bit's flipped logical state (i.e., the second logical state) as the bit's respective preferred logical state. Further, in operation 412, the PUF controller 114 uses the preferred logical states of the bits across the SRAM block to geneiate a PUF signature. As mentioned above, a PUF signature, generated based on one or more intrinsic characteristics of a coupled SRAM block, is unique to the SRAM block, and such an unique PUF signature may be more reliable if the PUF signature is generated based on stable bits of the SRAM block. The disclosed PUF controller 114 uses one or more reduced read margin techniques to identify such stable bits and thus the generated PUF signature using the identified stable bits is more reliable.

Figure 5:
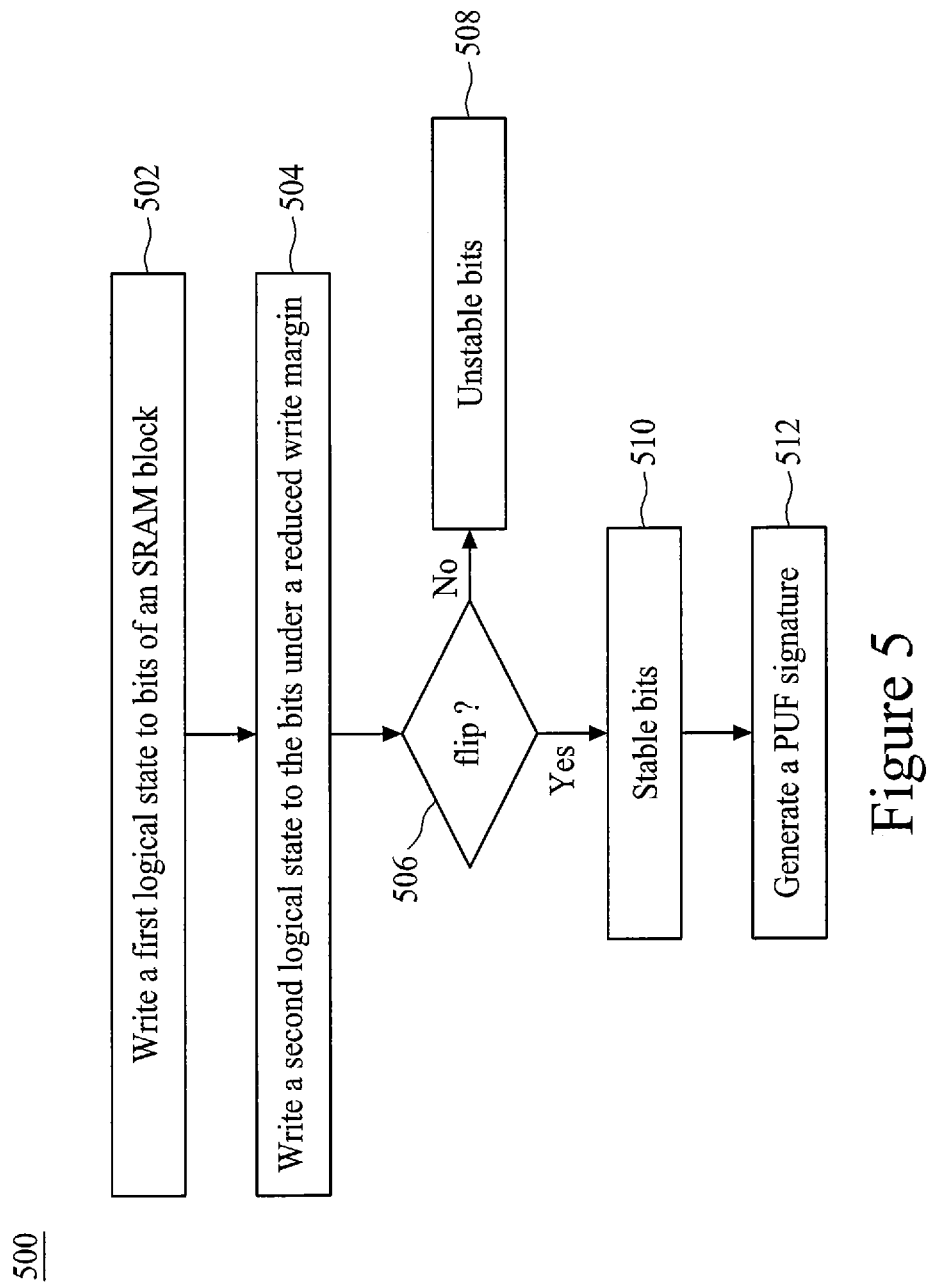
FIG. 5 illustrates another exemplary flow chart of a method of generating a physically unclonable function (PUF) signature based on one or more reduced write margins, in accordance with various embodiments.

FIG. 5 illustrates a flow chart of a method to generate a PUF signature for an SRAM block based on determining each bit's stability through one or more reduced write margin techniques, in accordance with various embodiments. In various embodiments, the operations of method 500 are performed by the respective components illustrated in FIGS. 1-3E. For purposes of discussion, the following embodiment of the method 500 will be described in conjunction with FIGS. 1-3E. The illustrated embodiment of the method 500 is merely an example. Therefore, it should be understood that any of a variety of operations may be omitted, re-sequenced, and/or added while remaining within the scope of the present disclosure.

The method 500 starts at operation 502 in which each bit of the SRAM block is written with a first logical state, in accordance with various embodiments. In an example, referring again to FIG. 1, in response to a challenge received through the port 118, the PUF controller 114 may cause the voltage controller 106 to turn on all the bits by pulling up each bit's bit voltage to a nominal voltage (e.g., Vdd), and, in some embodiments, use the WL voltage controller 108 to sequentially assert the plural WL's (e.g., 202-7, 202-8, 202-9, etc. of FIG. 2A) row by row so as to enable the respective bits on the asserted row to be written with the first logical state.

The method 500 continues to operation 504 in which each bit of the SRAM block is written with a second logical state that is complementary to the first logical state under a reduced write margin, in accordance with various embodiments. As described above, one or more reduced margin techniques may be performed by the PUF controller 114 to cause each bit to be written under a reduced written margin. For example, the PUF controller 114 may use the voltage controller 106 to provide an increased Vdd as each bit's bit voltage 203, as shown and discussed in FIG. 3C. Alternatively, the PUF controller 114 may use the WL voltage controller 108 to provide a decreased WL voltage to each bit, as shown and discussed in FIG. 3D. As another example, the PUF controller 114 may use the WL pulse width controller 110 to provide a decreased WL pulse width to each bit, as shown and discussed in FIG. 3E. Under such reduced write margins, the first logical state that is originally written to each bit may be overwritten by the second logical state, i.e., the first logical states flips to the second logical state.

The method 500 continues to determination operation 506 in which a flipping of the first logical state for each bit is detected, in accordance with various embodiments. Continuing with the above example, the PUF controller 114 reads out each bit's logical state after each bit is written under one or more reduced write margins so as to detect whether the first logical state has flipped to the second logical state that is complementary to the first logical state. If the first logical state did not flip, the method 500 proceeds to operation 508 in which the PUF controller 114 determines such a bit is an unstable bit. And in some embodiments, the PUF controller 114 may not use such bits to generate a PUF signature. On the other hand, if the first logical state has flipped, the method 500 continues to operation 510 in which the PUF controller 114 determines such a bit is a stable bit.

The method 500 continues to operation 512 in which the stable bits are then used to generate a PUF signature, in accordance with various embodiments. Continuing with the above example, once the PUF controller 114 determines which bits across the SRAM block 102 are stable bits, the PUF controller 114 may use each stable bit's flipped logical state (i.e., the second logical state) as the bit's respective preferred logical state. Further, in operation 512, the PUF controller 114 uses the preferred logical states of the bits across the SRAM block to generate a PUF signature. As mentioned above, such a PUF signature may be more reliable.

In an embodiment, an memory device is disclosed. The memory device includes a memory block that includes a plurality of memory bits, wherein each bit is configured to present a first logical state; and an authentication circuit, coupled to the plurality of memory bits, wherein the authentication circuit is configured to access a first bit under either a reduced read margin or a reduced write margin condition to determine a stability of the first bit by detecting whether the first logical state flips to a second logical state, and based on the determined stability of at least the first bit, to generate a physically unclonable function (PUF) signature.

In another embodiment, a memory device includes a memory block that includes a plurality of memory bits, wherein each bit is configured to present a first logical state; and an authentication circuit, coupled to the plurality of memory bits, wherein the authentication circuit is configured to access a first bit under either a reduced read margin condition or a reduced write margin condition to determine a stability of the first bit by detecting whether the first logical state flips to a second logical state, and use the second logical state to generate a physically unclonable function (PUF) signature if the first logical state flips.

Yet in another embodiment, a memory device includes a memory block that includes a plurality of memory bits, wherein each bit is configured to present a first logical state; and an authentication circuit, coupled to the plurality of memory bits, comprising: a voltage controller configured to provide a bit voltage to a first bit; a word line (WL) voltage controller configured to provide a WL voltage to the first bit; a WL pulse width controller configured to provide a WL pulse width of the WL voltage to the first bit; and a PUF controller coupled to the voltage controller, the WL voltage controller, and the WL pulse width controller, wherein the PUF controller is configured to use either the voltage controller or the WL voltage controller to cause the first bit to be accessed under a reduced read margin condition and the voltage controller, the WL voltage controller, or the WL pulse width controller to cause the first bit to be accessed under a reduced write margin condition.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
 a memory block that includes a plurality of memory bits, wherein each bit is configured to present a first logical state;
 an authentication circuit, coupled to the plurality of memory bits, wherein the authentication circuit is configured to access a first bit under either a reduced read margin or a reduced write margin condition to determine a stability of the first bit by detecting whether the first logical state flips to a second logical state, and based on the determined stability of at least the first bit, to generate a physically unclonable function (PUF) signature; wherein the authentication circuit comprises:
a voltage controller, coupled to the plurality of bits, and configured to provide a bit voltage to the first bit; and
a PUF controller coupled to the plurality of bits and the voltage controller, and configured to generate the PUF signature, and
wherein the PUF controller is configured to use the voltage controller to increase the bit voltage when the first logical state is to be overwritten with a second logical state that is complementary to the first logical state so as to cause the first bit to be accessed under the reduced write margin condition.

2. The memory device of claim 1, wherein the authentication circuit is further configured to use the second logical state to generate the PUF signature.

3. The memory device of claim 1, wherein when the first logical state does not flip, the authentication circuit is further configured not to use the first logical state to generate the PUF signature.

4. The memory device of claim 1, wherein the PUF controller is further configured to use the voltage controller to reduce the bit voltage when the first logical state is read out so as to cause the first bit to be accessed under the reduced read margin condition.

5. The memory device of claim 1, wherein the PUF controller is further configured to use the WL voltage controller to increase the WL voltage when the first logical state is read out so as to cause the first bit to be accessed under the reduced read margin condition.

6. The memory device of claim 1, wherein if the first logical state is overwritten by the second logical state, the authentication circuit is configured use the second logical state to generate the PUF signature.

7. The memory device of claim 1, wherein the PUF controller is configured to use the WL voltage controller to decrease the WL voltage when the first logical state is to be overwritten with a second logical state that is complementary to the first logical state so as to cause the first bit to be accessed under the reduced write margin condition.

8. The memory device of claim 7, wherein if the first logical state is overwritten by the second logical state, the authentication circuit is configured use the second logical state to generate the PUF signature.

9. The memory device of claim 1, wherein the PUF controller is configured to use the WL pulse width controller to decrease the pulse width of the WL voltage when the first logical state is to be overwritten with a second logical state that is complementary to the first logical state so as to cause the first bit to be accessed under the reduced write margin condition.

10. The memory device of claim 9, wherein if the first logical state is overwritten by the second logical state, the authentication circuit is configured use the second logical state to generate the PUF signature.

11. A memory device, comprising:
a memory block that includes a plurality of memory bits, wherein each bit is configured to present a first logical state;
an authentication circuit, coupled to the plurality of memory bits, wherein the authentication circuit is configured to access a first bit under either a reduced read margin condition or a reduced write margin condition to determine a stability of the first bit by detecting whether the first logical state flips to a second logical state, and use the second logical state to generate a physically unclonable function (PUF) signature if the first logical state flips, wherein the authentication circuit comprises:
a word line (WL) voltage controller, coupled to the plurality of bits, and configured to provide a WL voltage to the first bit; and
a PUF controller coupled to the plurality of bits and the voltage controller, and configured to generate the PUF signature, and
wherein the PUF controller is configured to use the WL voltage controller to decrease the WL voltage when the first logical state is to be overwritten with a second logical state that is complementary to the first logical state so as to cause the first bit to be accessed under the reduced write margin condition.

12. The memory device of claim 11, wherein if the first logical state does not flip, the authentication circuit is further configured not to use the first logical state to generate the PUF signature.

13. The memory device of claim 11, wherein the authentication circuit further comprises:
a word line (WL) voltage controller, coupled to the plurality of bits, and configured to provide a WL voltage to the first bit; and
a WL pulse width controller, coupled to the plurality of bits, and configured to provide a WL pulse width of the WL voltage to the first bit.

14. The memory device of claim 11, wherein the PUF controller is configured to use either the voltage controller to reduce the bit voltage or the WL voltage controller to increase the WL voltage when the first logical state is read out so as to cause the first bit to be accessed under the reduced read margin condition.

15. The memory device of claim 14, wherein if the first logical state is overwritten by the second logical state, the authentication circuit is configured use the second logical state to generate the PUF signature.

16. A memory device, comprising:
a memory block that includes a plurality of memory bits, wherein each bit is configured to present a first logical state; and
an authentication circuit, coupled to the plurality of memory bits, comprising:
a voltage controller configured to provide a bit voltage to a first bit;
a word line (WL) voltage controller configured to provide a WL voltage to the first bit;
a WL pulse width controller configured to provide a WL pulse width of the WL voltage to the first bit; and
a PUF controller coupled to the voltage controller, the WL voltage controller, and the WL pulse width controller,
wherein the PUF controller is configured to use either the voltage controller or the WL voltage controller to cause the first bit to be accessed under a reduced read margin condition and the voltage controller, the WL voltage controller, or the WL pulse width controller to cause the first bit to be accessed under a reduced write margin condition, and
wherein the PUF controller is configured to use the WL voltage controller to decrease the WL voltage when the first logical state is to be overwritten with a second logical state that is complementary to the first logical state so as to cause the first bit to be accessed under the reduced write margin condition.

17. The memory device of claim 16, wherein the PUF controller is further configured to detect whether the first logical state flips to a second logical state when the first bit is to be accessed under either the reduced read margin condition or the reduced write margin condition, and wherein if the first logical state flips, the PUF controller is further configured to use the second logical state to generate a PUF signature.

\* \* \* \* \*